United States Patent [19]

Wittel

[11] 4,029,997

[45] June 14, 1977

[54] SURGE VOLTAGE ARRESTER ARRANGEMENT

[75] Inventor: Hermann Wittel, Erlangen, Germany

[73] Assignee: Siemens Aktiengesellschaft, Munich, Germany

[22] Filed: Dec. 9, 1974

[21] Appl. No.: 530,970

[30] Foreign Application Priority Data

Dec. 21, 1973 Germany .......................... 2364034

[52] U.S. Cl. ................................ 361/129; 315/36; 361/120; 361/118

[51] Int. Cl.² ......................................... H02H 3/22

[58] Field of Search .................. 317/61, 62, 67, 68, 317/69, 70, 74, 11 D; 313/54, 231.1, 183, 217; 315/36

[56] References Cited

UNITED STATES PATENTS

| | | | |
|---|---|---|---|
| 1,906,602 | 5/1933 | Hull | 317/62 |
| 2,757,261 | 7/1956 | Lingal et al. | 317/11 D X |
| 2,862,152 | 11/1958 | Ryden | 317/61 X |
| 2,892,967 | 6/1959 | Hanlet | 313/54 X |
| 2,990,492 | 6/1961 | Wellinger et al. | 317/62 X |
| 3,515,934 | 6/1970 | Kershaw, Jr. | 317/70 X |
| 3,518,492 | 6/1970 | Kresge et al. | 317/68 |
| 3,733,520 | 5/1973 | Schei | 317/70 X |

*Primary Examiner*—J D Miller
*Assistant Examiner*—Patrick R. Salce
*Attorney, Agent, or Firm*—Kenyon & Kenyon Reilly Carr & Chapin

[57] ABSTRACT

An improved surge voltage arrester made up of a plurality of series arrays of magnetically blasted spark gaps arranged between two potentials with the gaps surrounded by a gas which increases their breakdown voltage, in which the connecting points of each two adjacent series arrays are connected through a control spark gap to the upper or lower potential with the control spark gaps surrounded by a gas which reduces their breakdown voltage.

11 Claims, 2 Drawing Figures

SURGE VOLTAGE ARRESTER ARRANGEMENT

BACKGROUND OF THE INVENTION

This invention relates to voltage arresters in general and more particularly to an improved arrangement including a plurality of series arrays of spark gaps which have associated therewith control spark gaps coupling each of the junctions between two series arrays with the upper or lower potential.

The use of metal enclosed switching installations with gas insulation capable of withstanding extremely high system voltages has within a short period of time become extremely significant in the power industry. With the steady increase in energy requirements and the associated high load densities associated therewith, the use of steadily increasing higher operating voltages for operational and economic reasons has developed. However, at the same time, the physical space available for switching installations to be constructed has become limited. By filling switching installations with an insulating gas, the area and space requirements for these installations can be reduced to approximately 10% of that required using conventional construction. All components in such installations which carry high voltage, such as conductor contacts and breaker quenching chambers are accommodated in a pole by pole manner within a metallic casing. Switching installations of this manner are often also equipped with surge voltage arresters. For general background on the use and types of surge voltages arresters known in the prior art, see Standard Handbook for Electrical Engineers edited by A. E. Knowlton, 9th ed., McGraw Hill, 1957, Section 12–138 et. seq. page 1033 et. seq.

Typical prior art surge voltage arresters, however, cannot be arranged within an enclosed installation itself.

Typically, sulfurhexafluoride is used for gas insulation. It has an electrical breakdown voltage which is approximately two to three times that of air at atmospheric pressure depending on the shape of the electrodes and the type of voltage stress. Generally, it is desireable to further increase the breakdown voltage by providing such a gas at an increased pressure of approximately 3 to 4 atm. abs. referenced to 20° C. If surge voltage arresters are installed within an enclosed switching installation of this nature, their breakdown voltage will be increased accordingly by the insulation gas. However, such breakdown voltage in surge voltage arresters should be as low as possible and, in some cases, cannot exceed the peak value of the operating voltage by a significant amount, i.e., in some cases the difference between the peak operating voltage and the voltage at which the surge voltage arrester must break down is very small. Reduction of the electrode spacing to take into account the increased breakdown voltage brought about by the insulating gas is possible only to a limiting distance of approximately 1 mm. This is a direct result of manufacturing tolerances which can be attained. Such a spacing is not sufficient to reduce the breakdown voltage to the required level.

Surge voltage arresters used in high voltage switching installations are usually valve-type arresters having spark gaps which fire when a surge voltage occurs to open up a low resistance current path through the arrester. Following such, the electric arc is then extinguished and the arrester is again rendered currentless. After the main portion of the surge voltage pulse has been conducted through the arrester, but with the electric arc still burning, a power frequency follow current will continue to flow. The spark gaps in the arrester must be arranged so that they are capable of interrupting this follow current.

Various arrangements for accomplishing this have been developed. For example, the spark gaps may be designed as horn-shaped electrodes each housed in an arcing chamber with a large number of these formed into a stack and the individual spark gaps connected in a series array. With such a stack, a blasting coil can be associated having a magnetic field which will tend to stretch the electric arc which exists between each of the two horn-shaped electrodes to thereby extinguish it. In another known arrangement in which blasting coils are not provided, the electric arc is driven under the effect of its own magnetic force between arc quenching plates. In such arrangements, the spark gaps are extinguished as the voltage passes through zero.

The breakdown voltage of high voltage arresters is generally a function of the steepness of the rising edge of the shock voltage wave which hits the arrester. For pulses having a rise time substantially shorter than, for example, one microsecond, the breakdown voltage of such arresters can experience an increase of more than 20%, i.e., the arrester will not respond until its nominal breakdown voltage is exceeded by more than 20%. This increase in the breakdown voltage for voltage pulses having a sharp rising edge is caused by the discharge delay and charging time of the breakdown. For plate type spark gaps having an almost homogeneous field, the increase of the breakdown voltage is less pronounced than is the case for the generally used modern magnetically blasted arresters such as those disclosed in German Offenlegunsschrift 1,286,190. However plate-type spark gaps are not suitable for pulse voltages unless additional special measures are taken. This is because the concentration of the electrical field at the edges results in an undefined discharge delay and brings about a correspondingly great spread of the breakdown voltage.

Also known in the art are arrangements of series arrays of two spark gaps. It has been found, however, that in such arrangements the breakdown voltage will decrease with multiple operations. The drop in breakdown voltage can be limited through the use of a special control spark gap associated with one of the spark gaps or with a series array of such spark gaps. In such an arrangement, a control spark gap with a limiting resistor in series is connected in parallel to one of the series arrays. The control spark gap contains two electrodes which are shaped in the manner of a corrugated board and which are positioned opposite each other at irregular distances along their lengthwise dimension. The minimum spacing between the two electrodes becomes the breakdown voltage of the spark gap. The breakdown voltage can be adjusted within a certain range by providing means for adjusting the electrode spaces such as a set screw. An arrangement such as this is described in U.S.S.R. Pat. 126,174. With a design of this nature the decrease in the breakdown voltage due to multiple operations will be limited. However, the spread of the breakdown voltage noted above remains comparatively high since breakdown takes place with preference at the edges of the electrodes because of the substantial field concentration which occurs at those points.

In view of these difficulties, it is the object of the present invention to provide an high voltage arrester having a low and adjustable constant breakdown voltage, which high voltage arrester can be arranged in a fully enclosed, insulating gas filled switching installation of the type described above.

SUMMARY OF THE INVENTION

The present invention makes use of the teaching of the above reference Soviet Patent. In the arrester of the present invention, a plurality of series arrays are provided. A plurality of series arrays are coupled between a high voltage conductor and a low voltage conductor, typically ground. The high voltage conductor will typically by one of the phase conductors. Between each junction of two adjacent series arrays and either the high voltage line or the low voltage line is coupled a controlled spark gap. The control spark gaps are each surrounded by a gas which reduces their response to voltage. The total series arrays are enclosed and surrounded by a gas which increases their response voltage. Through this arrangement the low response voltage of the installation is obtained through the use of the control spark gaps within an environment lowering their firing voltage while at the same time the series arrays of magnetically blasted spark gaps are situated in an enclosure surrounded by an insulating gas.

In the disclosed embodiment the response of the control spark gaps is staggered such that a sequential firing of the individual series arrays occurs. As each control spark gap fires, the individual series arrays in sequence experience a potential jump resulting in immediate firing.

Typically, the insulating gas used will be sulfurhexafluoride $SF_6$ although other gases which form negative ions may also be used. In the disclosed embodiment, the control spark gaps are preferably arranged in a container filled with nitrogen. The gases therein may also be air or a rare gas. The exact setting of the various breakdown values of the control spark gaps is insured through the use of control spark gap plate electrodes having edges shaped so that the field strength at their edge is smaller than that at the electrode center. In addition, the electrodes are irradiated with a radiation source causing ionization. Preferably, this is a ring-shaped source providing ionizing radiation directed from all sides towards the surfaces of the electrodes in a uniform manner. Through this shaping of the electrodes and the use of ionizing radiation, the spread of the breakdown voltage of the control spark gaps will be limited to a range of less than plus or minus 0.5%. In addition, the exact breakdown voltage is very accurately controlled.

DETAILED DESCRIPTION OF THE PREFERRED EMBODIMENT

Figure 1:
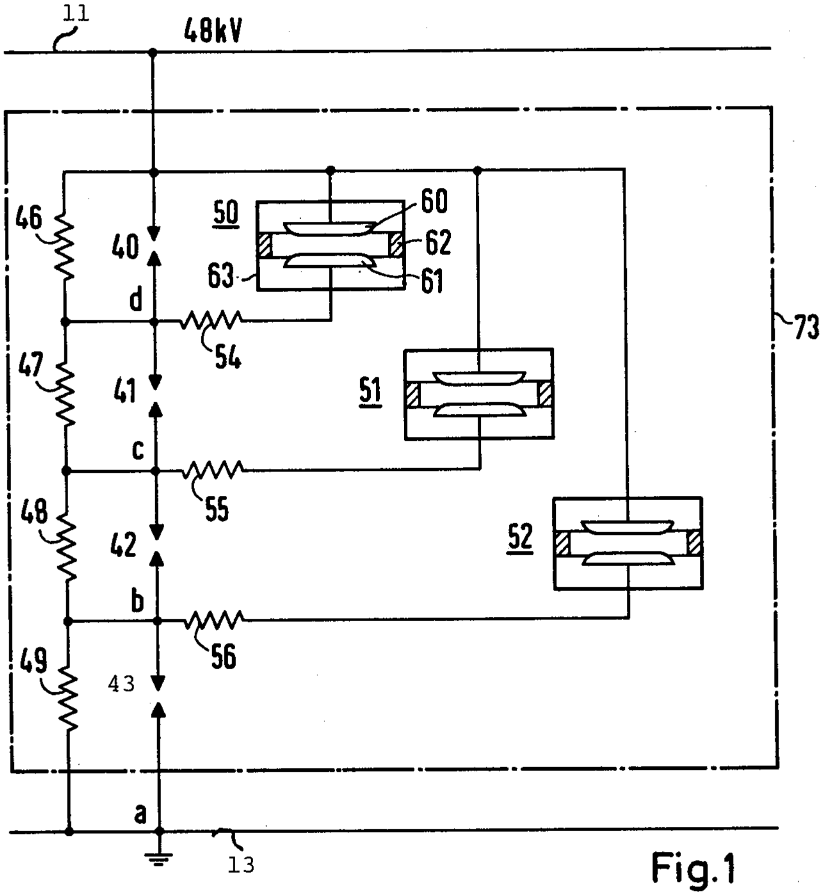
FIG. 1 is a schematic circuit diagram illustrating the present invention.

Shown in FIG. 1 is a high voltage surge arrester according to the present invention. The voltage arrester includes four stacks 40 to 43 each containing a series array of spark gaps with the stacks connected in series between a high voltage conductor 11 and a low voltage conductor 13 which, in the illustrated embodiment, is at ground potential. The series arrays in the stacks 40 – 43 are illustrated schematically and will each be of conventional design having a single magnetic blasting coil, i.e., they will be of the conventional type described above. Each of the series arrays 40 – 43 has a parallel resistor, the resistors being designated 46, 47, 48, 49. These parallel control resistors will preferably be voltage dependent resistors. Between each junction of a series array with another series array and the high voltage conductor 11, is a control spark gap. Thus, the control spark gap 50 is coupled between the conductor 11 and the junction point B. The control spark gap 50 is coupled between junction point C and conductor 11 and the control spark gap 52 between the junction point D and conductor 11. Each control spark gap has in series therewith a limiting resistor, the respective limiting resistors being designated 54, 55, and 56. As noted above, the arrestor disclosed herein is particularly for application in a switching installation. Typically the conductor 11 will be an input line to the switching installation being protected by the voltage arrester. In the illustrated embodiment the high voltage conductor is at a potential of 48 kv. In each of the control spark gaps 50, 51 and 52, a precisely adjustable and constant breakdown value for the gaps is obtained through the use of plate-type electrodes 60 and 61 having opposing surfaces and which are shaped as what are referred to as Rogowski-electrodes. These electrodes are shaped such that their field strength at their edge is smaller than the field strength at the electrode center. This profile was developed by Rogowski for measuring spark gaps and is described in B. Gaenger "The Electrical Breakdown of Gases", 1953, pp 9 – 12 in particular FIG. 5. The shape of the electrode surfaces that face each other can be obtained by approximating the edge of an electrode plate having the shape of an equal potential line produced through rotation of an equi-potential line about the electrode axis provided that the potential $\phi$ of this potential line is at most one-half of the potential $\phi_o$. Of the electrode plate from which the equi-potential line has been derived. Starting with this condition, i.e. $\phi = ½\phi_o$ the shape of the equi-potential line in a coordinate system having a *y*-axis lying on the center axis of the electrodes and an *x*-axis extending in the center of the plane between the electrodes is obtained from the following equations:

$$x = -d\frac{\Psi}{\phi_o} \quad \text{and}$$

$$y = d\left(½ + \frac{1}{\pi} e^{-\pi\Psi/\phi_o}\right)$$

In these equations *d* denotes the electrode spacing and $\Psi$ signifies a parameter which is varied between plus and minus infinity. In carrying out this computation, $\phi_o$ is given a fixed value. Additional simplification results through the elimination of the quantities $\Psi$ and $\phi_o$ from these equations. This can be done by determining the value $\Psi$ from the equation for *x* and substituting it into the equation for *y*. Through this substitution the following equation is obtained:

$$y = d\left(½ + \frac{1}{\pi} e^{-\pi x/d}\right)$$

With an electrode surface designed in this manner, a field which decreases from the electrode axis toward the edge of the electrodes is obtained.

To obtain a constant breakdown value for the electrodes the space between the electrodes is irradiated with a plurality of radiation sources 62. The electrodes 60 and 61 are enclosed within a container filled with a gas which reduces the breakdown voltage. Typically, this may be nitrogen although air and rare gases are also suitable. The radiation sources 62 provide ionizing radiation for the space. They are installed essentially in a plane midway between the two electrodes. Preferably they will be installed concentric to the electrode axis and will be installed next to one another and shaped to form a ring. They must have irradiation energy which is sufficiently high that free electrons are ejected from the surface of the electrodes 61 and 62. The ring-shaped radiation source 62 nearly uniformly irradiates the surface between the electrodes. The irradiation source may comprise at least, partially, activated carbon $C_{14}$. Other isotopes of carbon along with isotopes of silicon and boron may also be used. Whatever the radiation source, it should have a half life which is at least 10 years.

Such pre-ionization has been in general previously used. See, for example, "Separation of Gap Functions, a New Concept in Station Class Lightning Arrester Design", Westinghouse Electric Corp., Dec. 1971, pages 2104 to 2113. In the disclosed arrangement, the pre-ionization takes place using a tritium gas. The energy of the radioactive radiation of the tritium gas is sufficiently high that electrons are ejected from the surface of the metallic electrodes of the spark gap. In this arrangement the electrodes along with their charge must be enclosed in a gas-tight manner and the container made leakproof so as to prevent any diffusion of the radioactive gas to the outside.

In contrast thereto, the spark gap arrays 40 to 43 of the present invention are installed within a container 73 indicated in dot-dash lines on the Figure and which is filled with an insulating gas. Preferably, sulfurhexafluoride $SF_6$, will be used as the insulating gas. However, other gases which form negative ions such as carbon tetrachloride $CCL_4$ and carbon tetrachloride $CF_4$ can be used. Such a gas increases the breakdown voltage of the series connector spark gap arrays 40 to 43 by a factor of two or three. Preferably, the insulation gas will be under a pressure of between 1 to 5 bar, preferably between 2 to 4 bar and more particularly at approximately 3.3 bar. By increasing the pressure, the insulating capability of the gas and in turn the breakdown voltage of the spark gaps will be further increased.

Typically in an arrangement such as that shown in FIG. 1 for conductor 11 at 48 kv, four series arrays 40 to 43 each containing, for example, six spark gaps and designed so that peak value of their breakdown voltage amounts to 80 kV each will be provided. With this arrangement, the breakdown voltage of the overall high voltage arrester will be 320 kV. The extinguishing voltage of each series array is designed to be 12 kV so that the overall high voltage arrester will have an extinguishing voltage of 48 kV rms. In such a high voltage arrester, the pulse response voltage must be limited to 120 kV, i.e., if a pulse of greater than 120 kV occurs, the arrester must begin operation. As a result, the breakdown voltage of the overall arrangement must be lowered from 320 to 120 kV. This is accomplished through the control voltage divider made up of the resistors 46 and 49. The voltage divider is designed so that the potential is equally divided thereby resulting in a potential at point *b* of 30 kV, at point *c* of 60 kV and at point *d* of 90kV. With the voltage so divided, the voltage across the control spark gap 52 will be 90 kV when 120 kV is present on the line 11. At the same time the voltage across the control gap 51 will be only 60 kV and that across the control gap 50 30 kV. The control spark gap 52 is designed, in particular with regard to its electrode spacing, its gas pressure and pre-ionization to break down at a voltage of 90 kV. The profile of its electrodes is selected such that along with the pre-ionization which is provided, breakdown at precisely 90 kV will occur. This value will remain essentially constant.

As soon as a surge voltage of a value sufficient to cause the voltage across the control spark gap 52 rises above 90 kV occurs, this control spark gap will fire resulting in a conductive current path therethrough and also through the limiting register 56 to the junction point *b*. At junction point *b* the full voltage of 120 kV or greater will now appear. The series array 43 which is designed to break down at 80 kV will thus immediately fire. The limiting resistor 56 is of an extremely low value and will not result in any significant voltage drop. Once the series array 43 fires, resistor 49 will be shorted out and the junction point B will be essentially at ground potential. The full 120 kV will now appear across the resistors 46, 47 and 48 which will equally divide it into three parts. Thus, at point C, a voltage of 40 kV will be present and at point D a voltage of 80 kV. The voltage across the control gap 51 will now be 80 kV and that across the control gap 50, 40 kV. The control gap 51 is thus designed to fire at a voltage of 80 kV. Thus, it will then fire shorting out the resistor 48 and bringing the point C to ground potential. The two remaining resistors 46 and 47 will now divide the 120 kV voltage on line 11 into two 60 kV portions and a voltage of 60 kV will appear across the control spark gap 50. This control spark gap is thus designed to fire at 60 kV. It will thus fire resulting in essentially the full voltage being applied across the array 41 causing it to fire bringing the point *b* to ground potential. The array 40 now has full voltage thereacross and will also fire. Through this arrangement, sequential firing in a cascade fashion is maintained in an exact predetermined manner. The arrester thus presents an overall breakdown value which does not vary with the increasing slope of the rising edge of the surge voltage nor which changes after several responses to the high voltage arrester.

In the illustrated embodiment of FIG. 1, the control spark gaps 50, 51 and 52 each connect a junction point with the conductor 11 at high voltage. It is possible, however, to instead connect each of these junctions to the conductor 13 at low or ground potential. In such a case, the breakdown voltages of the control spark gaps will vary in the reverse sequence and they must be designed such that the highest breakdown voltage is present in the control spark gap 50 and the lowest breakdown voltage in the control spark gap 52.

Figure 2:
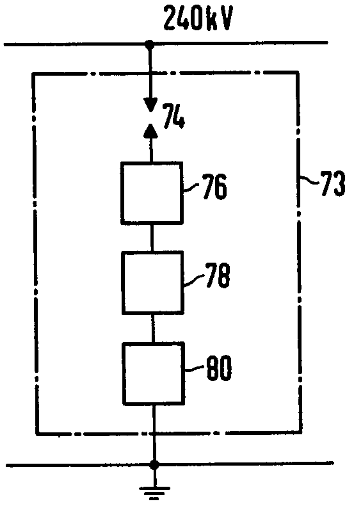
FIG. 2 is a block diagram illustrating the application of the arrangement of the present invention to a system of higher voltage.

Surge voltage arrester modules such as that disclosed in FIG. 1 can be used to great advantage in the protection of high voltage switching installations. FIG. 2 illustrates a high voltage arrester for 220 kV installation set to extinguish at a voltage of 240 kV, for example. It contains a series array of four surge voltage arrester modules 74, 76, 78 and 80. The module 74 will comprise a series of array spark gaps designed for an extinguishing voltage of 60 kV having control impedances such as those of FIG. 1 associated with it but not shown on the Figure. That is to say, the series array 74 will be of conventional design. The remaining series array 76, 78 and 80 will be designed in accordance with FIG. 1. These too will each be designed for an estinguishing voltage of 60 kV. These three units, i.e., the modules 76, 78 and 80 constructed in accordance with FIG. 1, will be fired in sequence after which the full potential will appear across the series array 74 causing it to fire. Thus, FIG. 2 illustrates how the teaching of FIG. 1 can be used to build systems for higher voltages.

Thus, an improved high voltage surge arrester has been shown. Although specific embodiments have been illustrated and described, it will be obvious to those skilled in the art that various modifications may be made without departing from the spirit of the invention which is intended to be limited solely by the appended claims.

What is claimed is:

1. A surge voltage arrester module having a plurality of series arrays of spark gaps arranged in series between an upper and a lower voltage wherein the improvement comprises:

a. a plurality of controlled spark gaps, each control spark gap coupling a different junction point between two series arrays to one of the two voltages;
b. means enclosing each of said control spark gaps;
c. a gas which reduces the breakdown voltage of said control spark gaps contained within said enclosing means; and
d. means enclosing the total series array including said control spark gaps and their individual enclosures; and
e. a gas which increases the breakdown voltage of said series arrays contained within said overall enclosing means.

2. Apparatus as in claim 1 wherein the gas within said means enclosing said control spark gaps is selected from the group consisting of nitrogen, a rare gas and air.

3. Apparatus as in claim 1 wherein said gas which increases breakdown voltage is an insulating gas which forms negative ions.

4. Apparatus as in claim 3 wherein said insulating gas is sulfurhexafluoride.

5. Apparatus as in claim 4 wherein said control spark gaps are made up of opposing plate-type electrodes shaped such that their electric field intensity is smaller at the edge of the electrodes than in the center of the electrodes and further including radiation sources located approximately in the plane of symmetry between the electrodes and concentric to the electrode axis for irradiating said electrode surfaces.

6. Apparatus as in claim 5 wherein said radiation sources are arranged in a ring.

7. Apparatus as in claim 5 wherein said radiation sources are selected from the group consisting of isotopes of boron, carbon and silicon.

8. Apparatus as in claim 1 wherein said control spark gaps are made up of opposing plate-type electrodes shaped such that their electric field intensity is smaller at the edge of the electrodes than in the center of the electrodes and further including radiation sources located approximately in the plane of symmetry between the electrodes and concentric to the electrode axis for irradiating said electrode surfaces.

9. Apparatus as in claim 8 wherein said radiation sources are arranged in a ring.

10. Apparatus as in claim 8 wherein said radiation sources are selected from the group consisting of isotopes of boron, carbon and silicon.

11. Apparatus as in claim 1 wherein a plurality of said modules are coupled in series to form a high voltage arrester.

* * * * *